May 27, 1969        D. WESTPHAL        3,446,471
MAGNETIC OPERATED VALVE UNIT, PARTICULARLY FOR GASES
Filed Nov. 1, 1966
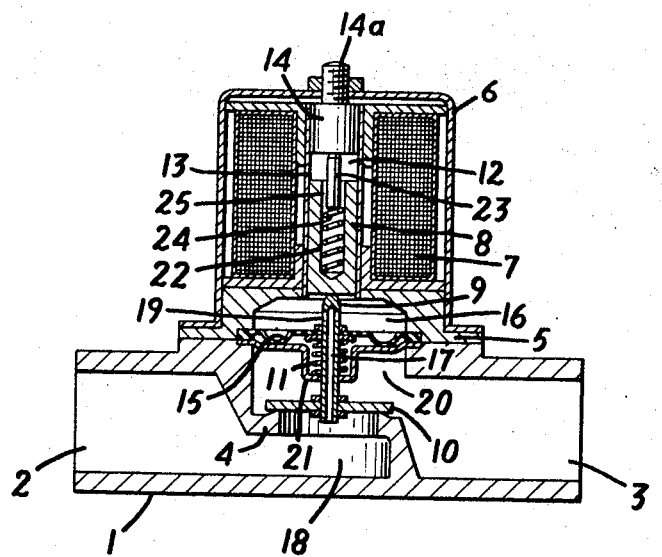

United States Patent Office 3,446,471
Patented May 27, 1969

3,446,471
MAGNETIC OPERATED VALVE UNIT,
PARTICULARLY FOR GASES
Dieter Westphal, Murwik-Flensburg, Germany, assignor to Danfoss A/S, Nordborg, Denmark, a company of Denmark
Filed Nov. 1, 1966, Ser. No. 591,327
Claims priority, application Germany, Nov. 4, 1965, D 48,579
Int. Cl. F16k 31/10
U.S. Cl. 251—52  2 Claims

ABSTRACT OF THE DISCLOSURE

Electro-magnetically operated valve having a damping arrangement, similar to a dash pot (constricted bypass tube (17), (19)) for the valve element (10) and a further damping arrangement for the operating plunger associated with the valve solenoid (7) to prevent chatter and noise.

---

The present invention relates to a magnetically operated valve, and more particularly to a valve unit for gases which has a closing member which includes an internal braking element to prevent chatter and rapid and noisy closing of the valve element.

Magnetically operating valves are usually controlled by a solenoid which has an ON and an OFF condition; upon energizing the solenoid, a magnetic plunger or core rapidly and abruptly changes position, carrying with it a valve opening-closing element. Operating such a valve can be noisy, which is undesired in many installations. The noise caused by movement of the valve element itself can be decreased by making the movement of the valve opening-closing member independent of the motion of the solenoid core, or armature, and providing a damping element so that the valve element reaches its final position slowly. Additionally, it is desirable to provide a pressure equalization chamber on both sides of the valve element so that the force of the pressure, to be closed off, is not entirely on the valve itself. Such a construction makes it possible to provide suitable damping for the valve opening and closing member. The motion of the solenoid armature, or plunger itself, may introduce undesirable noise in the operation of the valve.

It is an object of the present invention to provide a magnetically operated valve which is silent in operation and positively opens and closes.

Briefly, in accordance with the present invention, the magnetically operated valve has a housing in which inlet and outlet ducts are formed, connected by a valve seat against which a valve member is held. The valve member, which may be in form of a disc, cone, or the like is formed with a projecting operating pin. The resilient membrane is secured to the pin between which, and the housing, a chamber is defined, which may be filled with the gas to be controlled by the valve through a small central bore through the pin, terminating in a small aperture. The aperture, and the bore themselves, are so dimensioned that upon movement of the valve member, a small amount of the fluid may pass therethrough, thus damping the motion of the valve member as it, together with the membrane, compresses the fluid in the chamber. The valve member is operated by means of a plunger sliding in a central bore of a solenoid coil and being in operative engagement with the operating pin of the valve unit. The other end of the bore of the coil is closed off to provide a closed space between the plunger and the end, and to define another chamber. As the plunger moves into the chamber, any air therein will compress thus damping its movement and preventing striking of the plunger rapidly against the end and thus noisy operation.

The valve operation itself can be controlled by springs of suitable strength if the magnetically operating plunger associated with the solenoid is not directly operative on the valve element.

The structure, organization and operation of the invention will now be described more specifically in the following detailed description with reference to the accompanying drawings, in which:

The single figure is a cross-sectional view through a valve in accordance with the present invention.

A valve housing 1, having inlet and outlet connections 2 and 3, respectively, is formed with a valve seat 4, and an upper operating attachment 5. Operating attachment 5 includes an electro-magnet 6 having operating solenoid coil 7. The armature for the coil 8 acts on a valve member operating pin 9 carrying at its bottom end the valve closing element 10. A spring 11 presses the valve closing member 10 in open position when the magnet is energized.

The solenoid coil 7 is formed with a central bore 12, defined by a tube 13. The upper end thereof is closed off by a plug 14 which is secured to the magnet 6, for example by an adjustment screw 14a, which can be secured by a lock nut.

Circumferentially secured between the valve attachment 5 and the housing of the valve member 1, is a membrane 15, defining a chamber 16. Chamber 16 is connected with the inlet region 18 beneath the valve operating member 10 by means of a thin bore 17 extending through the pin 9, and terminating in cross bores 19, forming constricted openings into chamber 16. The pin 9 is secured to membrane 15 centrally thereof. The size of membrane 15 is so chosen that its effective surface is approximately equal to the effective surface of closing member 10. Thus, chamber 16 and region 18 in the valve inlet will be at the same pressure when the valve is closed; the pressure can equalize with the pressure in the outlet region 20 beneath the valve element 10 when the valve is open. The separating wall 21 protects membrane 15 and prevents excessive deformation, and simultaneously provides a seat for spring 11. Pin 9 is slidable therein through a central bore.

The armature for the magnet, formed as a plunger, is shown at 22; it contains an axial bore in which a pin 23 is inserted, having slight clearance therewith. Spring 24 is inserted between pin 23 and the bottom of bore 22 within plunger to hold the plunger in the position shown in the figure.

Pin 23, together with bore 22, provides a damping arrangement since the gas, in which the plunger operates, must escape in each instance through the constricted space 25 between pin 23 and bore 22. Thus, motion of the plunger is subject to braking action, in form of a dash pot. Simultaneously, motion of the valve operating member itself occurs gradually since each motion of the operating member requires that the medium contained within spaces 18, 20 passes through the fine bore 17 and the constricted openings 19, in order to equalize pressure between the valve connection spaces 18, 20 and chamber 16.

The valve according to the present invention thus provides for damped movement of all operating elements, preventing chatter, and noise of operation; the magnetic force, usually abruptly applied, is not effective immediately and instantly with respect to the entire opening motion.

The operation of the valve itself may be according to different principles. From the foregoing it will be clear: when coil 7 is energized, magnetic force will pull in the armature, causing slow escape of gases between the constricted space 25. The magnetic force overcomes the force of spring 24, and spring 11 can open the valve element 10 by pressing up against the membrane. Upon disconnection of the coil 7, spring 24, which is made to be stronger than spring 11, presses the plunger downwardly, and closes the valve, so that the elements will be in the position shown in the figure. Fluid medium within the inlet and outlet of the valve then equalizes through the central bore 17 to fill chamber 16. Special sealing means to prevent escape of such fluid from the valve is not necessary since all elements can be enclosed in a sealed housing, all motion taking place therein, with no connection to the outside whatsoever. No special damping fluid is necessary, the medium within the inlet and outlet, respectively, serving to dampen the motion of the valve operating member and the operating plunger.

I claim:

1. Magnetic valve unit having a housing; inlet and outlet ducts formed in said housing; a valve seat in a path between said inlet and outlet ducts; a valve member seating on said valve seat and having a projecting operating pin; a resilient membrane secured centrally to said operating pin, said membrane being peripherally secured in said housing and defining a chamber therewith; a bore formed through said valve member and said pin and opening into said chamber through a constriction to provide for damping of movement of said valve member; a coil having a central bore; and a plunger operatively associated with said operating pin to move said pin axially to operate said valve and slidable within said central bore and said coil with a sliding fit; means closing off the central bore of the coil, said plunger having a blind bore open towards said closing means; a spring in said blind bore; and a pin bearing against said spring at one end and against said closing means on the other, and the last-mentioned pin being slidable in said blind bore and having a loose sliding fit therewith, whereby a movement of the plunger in said central bore will be damped.

2. Valve unit as claimed in claim 1, for use as a control valve for a gaseous medium wherein the clearance of the fit between said last-mentioned pin sliding in the plunger and the blind bore is arranged and dimensioned to provide a dash pot effect.

References Cited

UNITED STATES PATENTS

| | | | |
|---|---|---|---|
| 2,969,088 | 1/1961 | Kramer | 251—30 X |
| 3,059,892 | 10/1962 | Windsor | 251—30 X |
| 3,103,612 | 9/1963 | Marmo | 251—54 X |
| 3,245,651 | 4/1966 | Erickson | 251—52 X |

ARNOLD ROSENTHAL, *Primary Examiner.*

U.S. Cl. X.R.

251—129